(12) United States Patent
Yourdkhani et al.

(10) Patent No.: US 11,993,018 B2
(45) Date of Patent: May 28, 2024

(54) METHOD AND DEVICE FOR PRINTING AND CURING THERMOSET RESIN

(71) Applicant: Colorado State University Research Foundation, Fort Collins, CO (US)

(72) Inventors: Mostafa Yourdkhani, Windsor, CO (US); Morteza Ziaee, Fort Collins, CO (US); Sean Smith, Loveland, CO (US); Carter Dojan, Fort Collins, CO (US)

(73) Assignee: Colorado State University Research Foundation, Fort Collins, CO (US)

(*) Notice: Subject to any disclaimer, the term of this patent is extended or adjusted under 35 U.S.C. 154(b) by 100 days.

(21) Appl. No.: 17/365,492

(22) Filed: Jul. 1, 2021

(65) Prior Publication Data

US 2022/0001615 A1 Jan. 6, 2022

Related U.S. Application Data

(60) Provisional application No. 63/047,380, filed on Jul. 2, 2020.

(51) Int. Cl.
| | | |
|---|---|---|
| *B29C 67/00* | (2017.01) |
| *B29C 64/165* | (2017.01) |
| *B29C 64/209* | (2017.01) |
| *B29C 64/218* | (2017.01) |
| *B29C 64/268* | (2017.01) |
| *B29C 64/295* | (2017.01) |
| *B29K 63/00* | (2006.01) |
| *B29K 75/00* | (2006.01) |
| *B29K 105/08* | (2006.01) |
| *B29K 105/12* | (2006.01) |
| *B29K 105/16* | (2006.01) |
| *B33Y 30/00* | (2015.01) |
| *B33Y 70/10* | (2020.01) |

(52) U.S. Cl.
CPC .......... *B29C 64/295* (2017.08); *B29C 64/165* (2017.08); *B29C 64/209* (2017.08); *B29C 64/218* (2017.08); *B29C 64/268* (2017.08); *B29K 2063/00* (2013.01); *B29K 2075/00* (2013.01); *B29K 2105/08* (2013.01); *B29K 2105/12* (2013.01); *B29K 2105/162* (2013.01); *B33Y 30/00* (2014.12); *B33Y 70/10* (2020.01)

(58) Field of Classification Search
CPC ... B29C 64/118; B29C 64/165; B29C 64/209; B29C 64/268; B29C 64/218
See application file for complete search history.

(56) References Cited

U.S. PATENT DOCUMENTS

| | | | | |
|---|---|---|---|---|
| 5,134,569 A | * | 7/1992 | Masters ................ | B29C 64/106 425/162 |
| 5,936,861 A | * | 8/1999 | Jang ...................... | B33Y 30/00 700/98 |
| 2014/0061974 A1 | * | 3/2014 | Tyler .................... | B29C 64/118 264/401 |

(Continued)

*Primary Examiner* — Ryan M Ochylski
(74) *Attorney, Agent, or Firm* — Robinson IP Law, PLLC (57) ABSTRACT

Various implementations include a method of printing and curing of thermoset resin. The method includes outputting a thermoset resin from an outlet of a feeder and directing a stimulus from a stimulation source toward a portion of the output thermoset resin that is downstream from the outlet of the feeder. The stimulus is configured to heat the portion of the output thermoset resin to fully cure the portion of the output thermoset resin.

21 Claims, 5 Drawing Sheets

(56) References Cited

U.S. PATENT DOCUMENTS

2016/0136885 A1\* 5/2016 Nielsen-Cole ........ B29C 64/218
                                                425/461
2018/0207850 A1\* 7/2018 Stockett ................ B29C 64/209
2018/0235030 A1\* 8/2018 Tyler ...................... B33Y 70/00

\* cited by examiner

METHOD AND DEVICE FOR PRINTING AND CURING THERMOSET RESIN

CROSS-REFERENCE TO RELATED APPLICATIONS

This application claims the benefit of U.S. Provisional Patent Application No. 63/047,380, filed Jul. 2, 2020, the contents of which are incorporated herein by reference in their entirety.

BACKGROUND

Conventional manufacture of high-performance thermosets and composites may include additive manufacturing techniques that can be used to deposit layers of resin to form a predetermined shape. However, once the resin has been deposited, the resin must be cured at elevated temperatures (~180° C.) for several hours in large ovens and autoclaves that scales in size with the part. In addition, manufacture of parts with complex geometries requires design and fabrication of complex molds and tooling. The conventional approach is slow and labor-intensive, requires a large amount of energy, and involves significant capital investment.

Other manufacturing techniques use frontal polymerization in which a resin capable of a self-sustaining reaction is deposited onto a heated build plate to begin the curing of the resin. Because the resin is capable of a self-sustaining reaction, the polymerization continues along the deposited resin creating a "front" of polymerization that continues along the output stream of resin. This allows for creating freeform structures without the need for complex molds and tooling. The feeder must move at a speed that is matched to the polymerization rate (the advancement of the "front") to prevent the resin from polymerizing within the feeder or to prevent too much unsupported, liquid resin from being output. Thus, the speed of frontal polymerization is limited by the polymerization rate of the resin. Furthermore, the polymerization rate of the resin can be altered by ambient temperatures, making frontal polymerization difficult and unpredictable in some ambient conditions. Also, frontal polymerization is limited to resins that are capable of self-sustaining reactions.

Other conventional manufacturing techniques use UV-sensitive resin in which the resin is cured immediately after deposition using ultraviolet irradiation to capture the printed geometry. In general, parts fabricated by UV-curing 3D printing techniques are brittle and have poor mechanical properties and fracture toughness. Additionally, UV-sensitive resins have low photo curing conversion and need additional curing steps to be used in load-bearing applications.

Thus, a need exists for an additive manufacturing device and method that can print and cure any size part at high speeds from any type of thermally curable thermoset resin in any ambient conditions without complex molds and tooling or the need for an oven, autoclave, or other post-curing steps.

SUMMARY

Various implementations include a method of printing and curing of thermoset resin. The method includes outputting a thermoset resin from an outlet of a feeder and directing a stimulus from a stimulation source toward a portion of the output thermoset resin that is downstream from the outlet of the feeder. The stimulus is configured to heat the portion of the output thermoset resin to fully cure the portion of the output thermoset resin.

In some implementations, the feeder includes a nozzle and the nozzle defines the outlet. The thermoset resin is extruded through the outlet of the nozzle. In some implementations, the feeder includes a printhead and the outlet is a roller for directing the thermoset resin.

In some implementations, the method further includes providing a build plate and a computer numerical control (CNC) machine for moving the feeder and the stimulation source relative to the build plate. The feeder and the stimulation source are stationary relative to each other.

In some implementations, the stimulus from the stimulus source is the only stimulus applied to the portion of the output thermoset resin.

In some implementations, the portion of the output thermoset resin at which the stimulus is directed remains a predetermined distance from the outlet of the feeder throughout the extrusion of the thermoset resin.

In some implementations, the simulation source includes a laser. In some implementations, the stimulus includes infrared light. In some implementations, the stimulus includes ultraviolet light. In some implementations, the stimulus includes visible light. In some implementations, the stimulus includes microwaves. In some implementations, the stimulus includes an electromagnetic field. In some implementations, the stimulus includes ultrasonic waves.

In some implementations, the thermoset resin includes an embedded reinforcing material. In some implementations, the embedded reinforcing material includes a continuous fiber. In some implementations, the embedded reinforcing material includes discontinuous fibers. In some implementations, the embedded reinforcing material includes nanoparticles.

In some implementations, the thermoset resin includes a cyclic olefin. In some implementations, the thermoset resin includes an epoxy. In some implementations, the thermoset resin includes a polyurethane.

Various other implementations include a device for printing and curing of thermoset resin. The device includes a feeder having an outlet for outputting a thermoset resin and a stimulation source structured to direct a stimulus toward a portion of the output thermoset resin that is downstream from the feeder. The stimulus is configured to heat the portion of the output thermoset resin to fully cure the portion of the output thermoset resin.

In some implementations, the feeder includes a nozzle and the nozzle defines the outlet, wherein the outlet of the nozzle is for extruding the thermoset resin. In some implementations, the feeder includes a printhead and the outlet is a roller for directing the thermoset resin.

In some implementations, the device further includes a build plate and a computer numerical control (CNC) machine for moving the feeder and the stimulation source relative to the build plate. The feeder and the stimulation source are stationary relative to each other.

In some implementations, the stimulus from the stimulus source is the only stimulus applied to the portion of the output thermoset resin.

In some implementations, the portion of the output thermoset resin at which the stimulus is directed remains a predetermined distance from the outlet of the feeder throughout the extrusion of the thermoset resin.

In some implementations, the simulation source includes a laser. In some implementations, the stimulus includes infrared light. In some implementations, the stimulus includes ultraviolet light. In some implementations, the stimulus includes visible light. In some implementations, the stimulus includes microwaves. In some implementations, the stimulus includes an electromagnetic field. In some implementations, the stimulus includes ultrasonic waves.

In some implementations, the device is capable of outputting thermoset resin that includes an embedded reinforcing material. In some implementations, the embedded reinforcing material includes a continuous fiber. In some implementations, the embedded reinforcing material includes discontinuous fibers. In some implementations, the embedded reinforcing material includes nanoparticles.

In some implementations, the thermoset resin includes a cyclic olefin. In some implementations, the thermoset resin includes an epoxy. In some implementations, the thermoset resin includes a polyurethane.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods disclosed herein provide for a technique for digital manufacturing of thermoset polymers, nanocomposites, and fiber-reinforced polymer composite (FRPC) materials and structures with minimal energy input at high production rates. The devices, systems, and methods allow for simultaneous printing and curing of thermoset polymers and their composites, eliminating the need for ovens and autoclaves, mold design and fabrication, long cure cycles, manual labor, excessive external energy, and other post-curing steps. This approach can manufacture resin systems that instantaneously polymerize and solidify at elevated temperatures in response to a local heat source. The resin, with or without reinforcements, can be extruded from the nozzle of a printing robot and heated immediately using a local stimulus that controllably generates heat. The resin will then polymerize instantaneously as a result of local rise in temperature, and thereby capturing the desired print geometry.

The use of thermo-responsive resins along with local heating enables energy-efficient curing of thermoset polymers and composites as the material is energetic by itself and produces heat for its synthesis through exothermic chemical reaction. Also, local heating minimizes the energy required for curing/manufacturing compared to conventional energy intensive and inefficient processes where the heat generated by an oven, autoclave, or heated mold is transferred to the material via conduction and/or convection heat transfer mechanisms.

In printing of resin ink without fillers, with nanoparticles, or with discontinuous fiber reinforcements, the resin can be extruded from the nozzle of any printing robots based on direct ink writing (DIW) technique. The heat source will be mounted on the print head and focused for on-demand cure. The use of nanoparticles and discontinuous fibers offer several advantages including tuning the rheological properties of printing ink, enabling energy-conversion mechanisms, and imparting multifunctional properties (mechanical, electrical, thermal, electromagnetic shielding) to the printed materials and structures. When using continuous fiber reinforcement, it is necessary to pre-impregnate fibers with the resin and then guide the pre-impregnated fibers through the print head where the local heat source will cure the FRPC.

Continuous carbon fiber filaments, discontinuous (short) carbon fibers, carbon nanoparticles (e.g. carbon nanotube, graphene, carbon black, carbon nanofiber), or carbon microparticles can be used as reinforcements and also as light-absorbing materials for the photothermal conversion phenomenon. Using these materials system along with the proper external stimulus has enabled simultaneous printing and curing of thermoset composites. More importantly, it is possible to print freeform structures (in-the-air printing)—eliminating the need for supports—at high printing speeds (up to 2 m/min) without the need for any post-treatment or post-cure steps.

Various implementations include a method of printing and curing of thermoset resin. The method includes outputting a thermoset resin from an outlet of a feeder and directing a stimulus from a stimulation source toward a portion of the output thermoset resin that is downstream from the outlet of the feeder. The stimulus is configured to heat the portion of the output thermoset resin to fully cure the portion of the output thermoset resin.

Various other implementations include a device for printing and curing of thermoset resin. The device includes a feeder having an outlet for outputting a thermoset resin and a stimulation source structured to direct a stimulus toward a portion of the output thermoset resin that is downstream from the feeder. The stimulus is configured to heat the portion of the output thermoset resin to fully cure the portion of the output thermoset resin.

Figure 1:
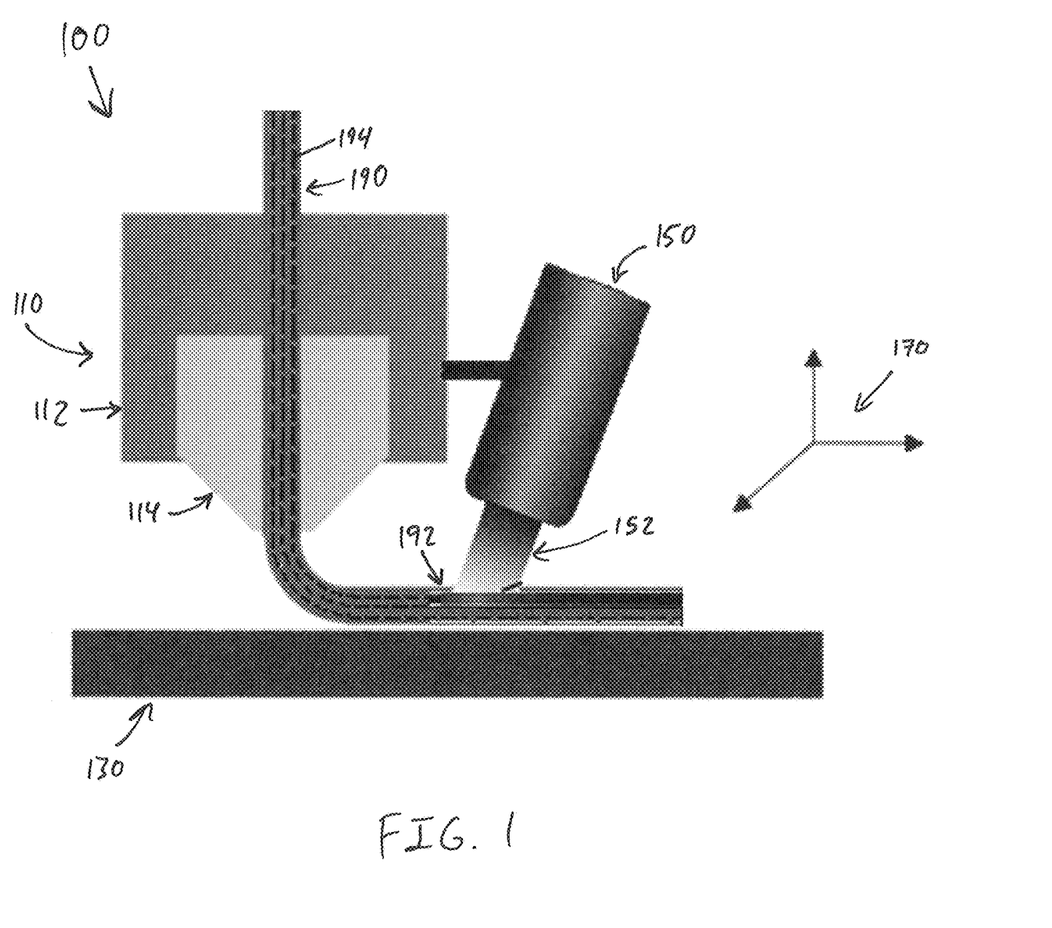
FIG. 1 is a side view of a device for printing and curing of thermoset resin, according to one implementation.

FIG. 1 shows a device 100 for printing and curing of thermoset resin. The device 100 includes a feeder 110, a build plate 130, a stimulation source 150, and a computer numerical control (CNC) machine 170. The feeder 110 is for outputting a thermoset resin 190. The feeder 110 shown in FIG. 1 includes a nozzle 112 that defines an outlet 114. The nozzle 112 extrudes the thermoset resin 190 through the outlet 114 such that the build plate 130 supports the output thermoset resin 190 either directly or indirectly.

Figure 2:
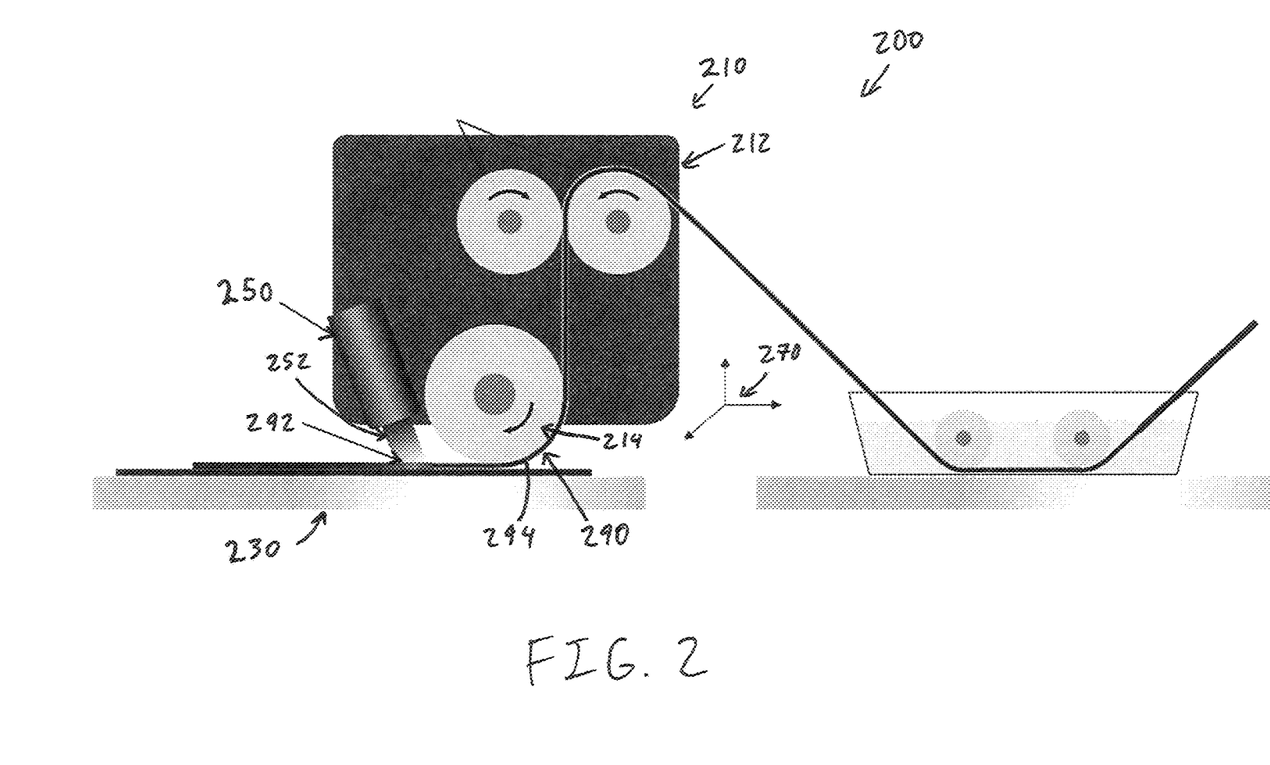
FIG. 2 is a side view of a device for printing and curing of thermoset resin, according to another implementation.
Figure 3A:
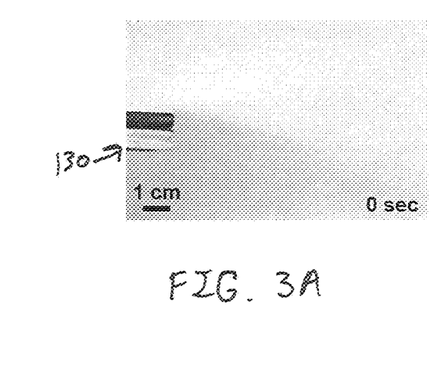
FIGS. 3A-3H are side views of the device of FIG. 1 printing and curing thermoset resin.
Figure 3B:
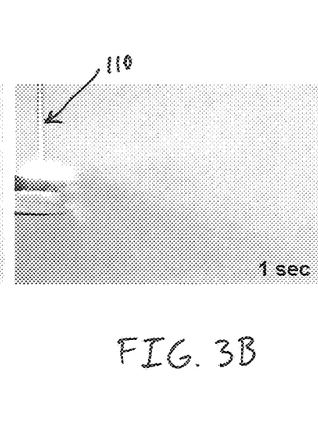
Figure 3C:
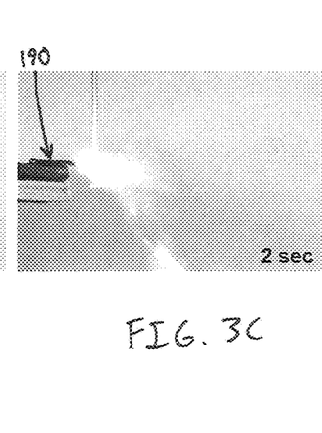
Figure 3D:
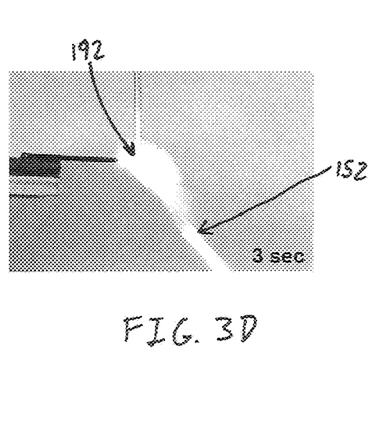
Figure 3E:
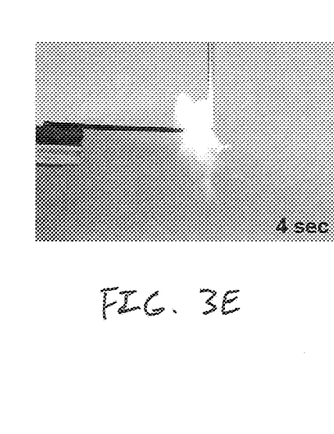
Figure 3F:
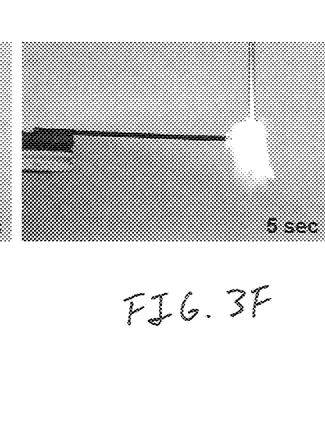
Figure 3G:
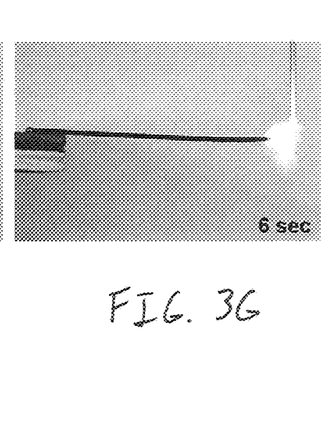
Figure 3H:
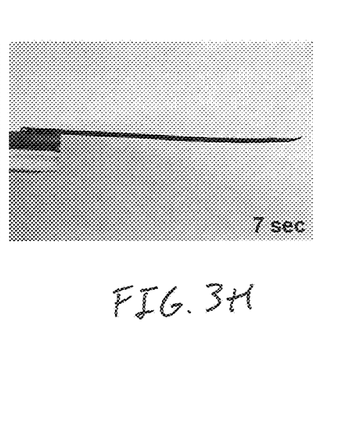
Figure 4A:
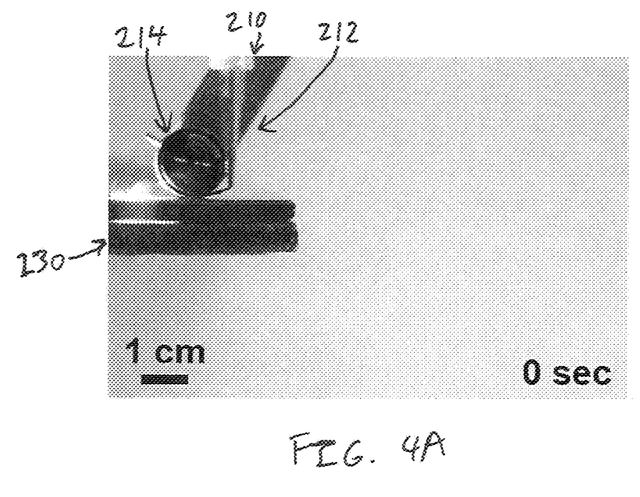
FIGS. 4A-4D are side views of the device of FIG. 2 printing and curing thermoset resin.
Figure 4B:
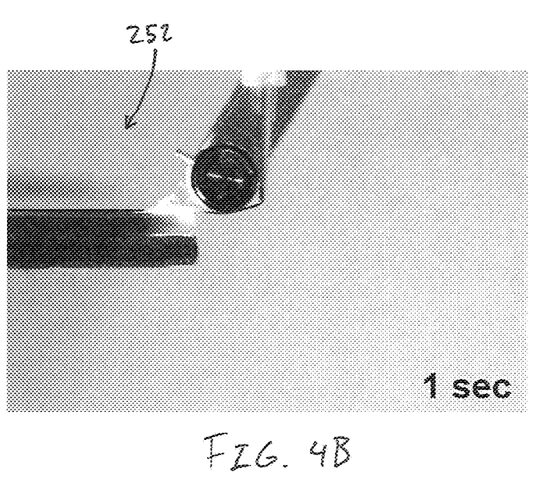
Figure 4C:
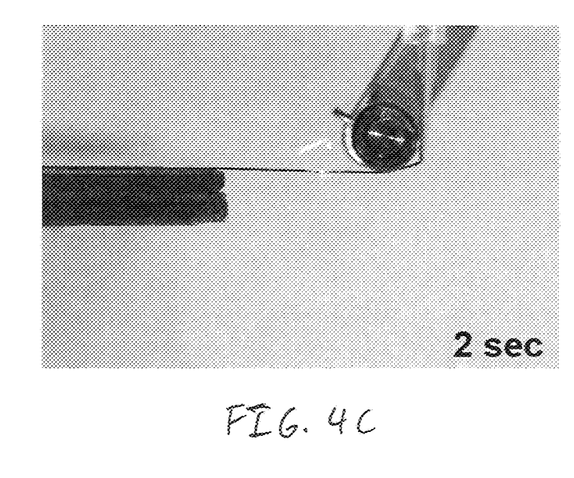
Figure 4D:
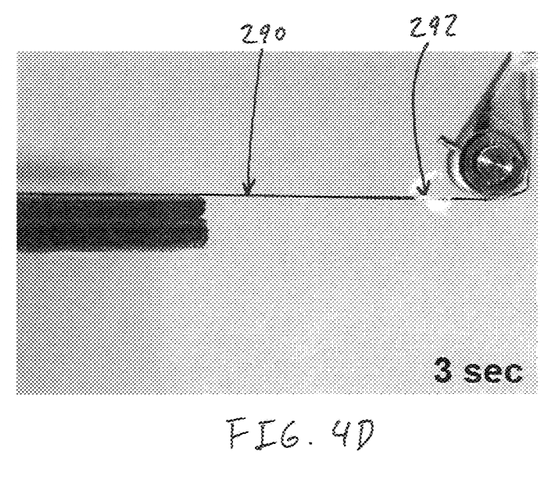

Although the feeder 110 shown in FIG. 1 includes a nozzle 112, in other implementations, such as the device 200 shown in FIG. 2, the feeder 210 includes a printhead 212. The outlet 214 of the printhead 212 is a roller that directs a continuous carbon fiber 294 coated in thermoset resin 290 as the continuous carbon fiber 294 coated in thermoset resin 290 is output from the printhead 212 such that the build plate 230 supports the continuous carbon fiber 294 coated in thermoset resin 290 either directly or indirectly.

In other implementations, the feeder can be any other device capable of outputting a thermoset resin and/or continuous fiber (e.g., carbon fiber) through an outlet.

The stimulation source 150, 250 is structured to direct a stimulus 152, 252 toward a portion 192, 292 of the output thermoset resin 190, 290 that is downstream from the feeder 110, 210. The stimulus 152, 252 is configured to add heat energy to the portion 192, 292 of the output thermoset resin 190, 290 to fully cure the portion 192, 292 of the output thermoset resin 190, 290. As used herein, the term "fully cure" means at least 96% cured. In some implementations, the thermoset resin is cured by the stimulus to at least 98%.

As seen in FIGS. 1 and 2, the stimulus source 150, 250 is a laser configured to output a blue light stimulus 152, 252. The blue light stimulus 152, 252 is concentrated on a portion 192, 292 of the thermoset resin 190, 290 adjacent and downstream from the outlet 114, 214 of the feeder 110, 210. As the thermoset resin 190, 290 is output from the outlet 114, 214, the thermoset resin 190, 290 is in an uncured, liquid, semi-liquid, or semi-solid state. Thus, the output thermoset resin 190, 290 is unable to support itself over long distances. However, shortly after the thermoset resin 190, 290 is output from the outlet 114, 214 of the feeder 110, 210, the blue light laser stimulus 152, 252 adds energy to the thermoset resin 190, 290, causing the thermoset resin 190, 290 to fully cure into a solid state and allowing the thermoset resin 190, 290 to support itself.

In both of the implementations shown in FIGS. 1 and 2, the feeder 110, 210 and the stimulus source 150, 250 are coupled to a CNC machine 170 for moving the feeder 110, 210 and the stimulus source 150, 250 in three dimensions relative to the build plate 130. Thus, as the thermoset resin 190, 290 is output from the outlet 114, 214 of the feeder 110, 210, the CNC 170 can move the feeder 110, 210 and stimulus source 150, 250 relative to the build plate 130 to cause the thermoset resin 190, 290 to form any desired shape. The CNC 170 can cause the thermoset resin 190, 290 to be output directly onto the build plate 130 or output indirectly onto other thermoset resin 190, 290, a tool/mold, or any other component that is supported on the build plate 130. Because the feeder 110, 210 and the stimulation source 150, 250 are coupled to the CNC machine 170 such that they are stationary relative to each other, the stimulus 152, 252 from the stimulation source 150, 250 remains directed at a portion 192, 292 of the output thermoset resin 190, 290 that is a predetermined distance from the outlet 114, 214 of the feeder 110, 210 throughout the extrusion of the thermoset resin 190, 290. Based on the rate at which a given thermoset resin 190, 290 fully cures and the amount of energy being added to the portion 192, 292 of the thermoset resin 190, 290 by the stimulus 152, 252, the rate of output from the outlet 114, 214 of the feeder 110, 210 and the movement speed of the CNC machine 170 can be determined such that the outlet 114, 214 of the feeder 110, 210 remains the predetermined distance from the curing front of the output thermoset polymer 190, 290.

In some implementations, the device does not include a build plate and the thermoset resin is output onto other thermoset resin, a tool/mold, or any other component that is not supported on a build plate. In some implementations, the device does not include a CNC, and the feeder is either stationary or is manually moved. In some implementations, the feeder is coupled to a robotic platform or a dispensing machine.

The thermoset resin 190, 290 used in the devices 100, 200 shown in FIGS. 1 and 2 can be any prepolymer known in the art, such as any monomer or oligomer. The prepolymer can be any self-sustaining reaction type prepolymer such as any frontal polymerization resin known in the art. The prepolymer can also be any non-self-sustaining reaction type prepolymer known in the art. In some implementations, the thermoset resin includes cyclic olefin, epoxy, polyurethane, acrylate, or thiolene. In some implementations, the thermoset resin could be a copolymer.

The thermoset resin 190 shown in FIG. 1 includes discontinuous embedded reinforcing fibers 194, but in other implementations, the thermoset resin includes continuous reinforcing fibers, nanoparticles, microparticles, any other reinforcing material known in the art, or any combination of two or more types of reinforcing materials. In some implementations, the reinforcing material includes carbon, metal, glass, polymer, or any combination of two or more materials. In some implementations, the thermoset resin does not include any reinforcing materials.

The continuous fibers 294 shown in FIG. 2 is coated in a thermoset resin 290, but in other implementations, the thermoset resin includes discontinuous reinforcing fibers, nanoparticles, microparticles, any other reinforcing material known in the art, or any combination of two or more types of reinforcing materials. In some implementations, the reinforcing material includes carbon, metal, glass, polymer, or any combination of two or more materials. In some implementations, the thermoset resin does not include any reinforcing materials.

The stimulation source 150, 250 shown in FIGS. 1 and 2 is a laser that emits a blue light stimulus 152, 252 for adding energy to the thermoset resin 190, 290. However, in other implementations, the stimulus can include infrared light, ultraviolet light, or visible light. In some implementations, the stimulus can include radio waves, microwaves, ultrasonic waves, or any other waves capable of adding energy to the thermoset resin. In some implementations, the stimulus is electric current that causes an electrothermic effect as it passes through the thermoset resin. In some implementations, the stimulus includes high energy plasma electrons to cause plasma induced heating of the thermoset resin. In some implementations, the thermoset resin includes superparamagnetic particles and the stimulus is an alternating magnetic field that excites the magnetic moment fluctuations in the superparamagnetic particles to generate heat in the thermoset resin. In some implementations, the stimulus from the stimulation source is the only stimulus applied to the portion of the output thermoset resin. In some implementations, the two or more stimuli are applied to the thermoset resin.

FIGS. 3A-3H show the device 100 of FIG. 1 being used to print and cure a thermoset resin 190. The device 100 outputs a thermoset resin 190 from the outlet 114 of the nozzle 112 of the feeder 110. As the thermoset resin 190 is deposited directly onto the build plate 130, the blue light laser stimulus 152 from the laser stimulation source 150 is directed toward the portion 192 of the output thermoset resin 190 that is downstream from the outlet 114 of the nozzle 112 of the feeder 110. The blue light laser stimulus 152 heats the portion 192 of the output thermoset resin 190 enough to fully cure the portion 192 of the output thermoset resin 190.

As the outlet 114 of the nozzle 112 of the feeder 110 outputs the thermoset resin 190, the CNC machine 170 causes both the feeder 110 and the stimulation source 150 to move horizontally relative to the build plate 130. Because the feeder 110 and the stimulation source 150 are coupled to the CNC machine 170, the feeder 110 and the stimulation source 150 are able to move together such that the portion 192 of the output thermoset resin 190 at which the stimulus 152 is directed remains a predetermined distance from the outlet 114 of the feeder 110 throughout the extrusion of the thermoset resin 190. As seen in FIGS. 3A-3H, the portion 192 of the output thermoset resin 190 at which the stimulus 152 is directed is very close to the outlet 114 of the nozzle 112 of the feeder 110, which minimizes the amount of uncured output thermoset resin 190 between the portion 192 and the outlet 114 and decreases the effect of gravity on the uncured output thermoset resin 190. This allows for the resulting polymer structure to be printed and cured without direct support (e.g., without the use of tools and molds), as demonstrated by the cantilevered structure formed in FIGS. 3A-3H.

FIGS. 4A-4D show the device 200 of FIG. 2 being used to print and cure a thermoset resin 290. The device 200 outputs a thermoset resin 290 from the outlet roller 214 of the printhead 212 of the feeder 210. As the thermoset resin 290 is deposited directly onto the build plate 230, the blue light laser stimulus 252 from the laser stimulation source 250 is directed toward the portion 292 of the output thermoset resin 290 that is downstream from the outlet roller 214 of the printhead 212 of the feeder 210. The blue light laser stimulus 252 heats the portion 292 of the output thermoset resin 290 enough to fully cure the portion 292 of the output thermoset resin 290.

As the outlet roller 214 of the printhead 212 of the feeder 210 outputs the thermoset resin 290, the CNC machine 270 causes both the feeder 210 and the stimulation source 250 to move horizontally relative to the build plate 230. Because the feeder 210 and the stimulation source 250 are coupled to the CNC machine 270, the feeder 210 and the stimulation source 250 are able to move together such that the portion 292 of the output thermoset resin 290 at which the stimulus 252 is directed remains a predetermined distance from the outlet 214 of the feeder 210 throughout the extrusion of the thermoset resin 290. As seen in FIGS. 4A-4D, the portion 292 of the output thermoset resin 290 at which the stimulus 252 is directed is very close to the outlet roller 214 of the printhead 212 of the feeder 210, which minimizes the amount of uncured output thermoset resin 290 between the portion 292 and the outlet 214 and decreases the effect of gravity on the uncured output thermoset resin 290. This allows for the resulting polymer structure to be printed and cured without direct support (e.g., without the use of tools and molds), as demonstrated by the cantilevered structure formed in FIGS. 4A-4D.

Figure 5A:
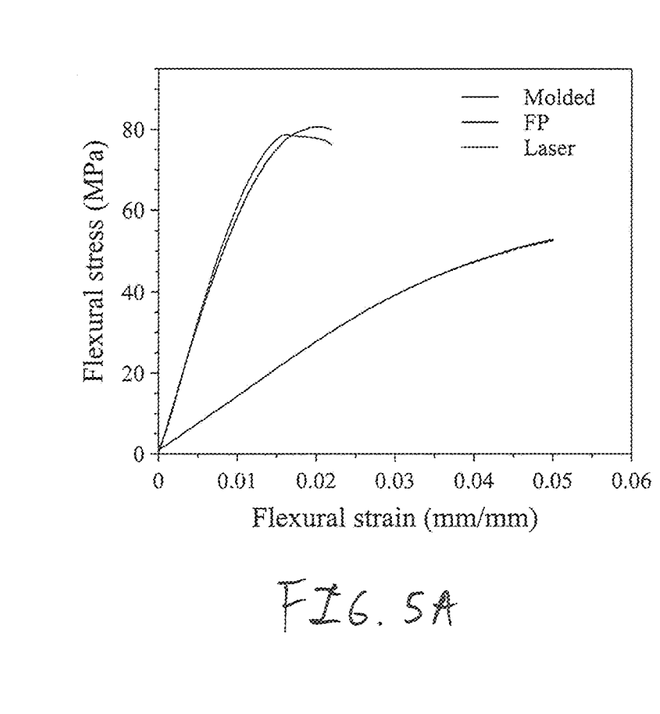
FIGS. 5A-5B are graphs comparing mechanical properties of parts created using molding, frontal polymerization, and the device of FIG. 1.
Figure 5B:
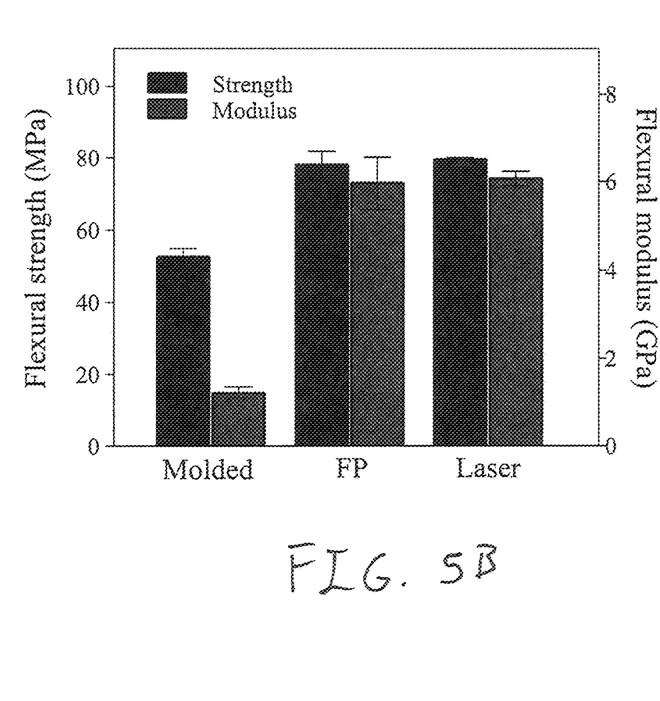

FIGS. 5A and 5B show a comparison of the mechanical properties of cured resin produced through molding, frontal polymerization, and the blue light laser curing method shown in FIGS. 3A-3H. It should be noted that the molded samples used in the results shown in FIGS. 5A and 5B do not include reinforcing fibers, while the samples created using frontal polymerization and the disclosed blue light laser technique in 15% by volume carbon fiber composite. The frontal polymerization sample and the disclosed blue light laser technique were both 3D printed. In each of the molding, frontal polymerization, and the blue light laser samples, the degree of conversion of resin (i.e., the degree of cure) was higher than 99%. As seen in FIGS. 5A and 5B, the mechanical properties of the cured part created using the disclosed blue light laser technique is comparable to the mechanical properties of the cured part created using frontal polymerization.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A device for printing and curing of thermoset resin, the device comprising:
    a feeder having an outlet for outputting a thermoset resin;
    a stimulation source structured to direct a stimulus toward a portion of the output thermoset resin that is downstream from the feeder, wherein the stimulus is configured to heat the portion of the output thermoset resin to fully cure the portion of the output thermoset resin; and
    a computer numerical control (CNC) machine for moving the feeder and the stimulation source,
    wherein the device is configured such that a feed rate of output of thermoset resin from the outlet of the feeder and a movement speed of the CNC machine are determined as a function of a rate at which the thermoset resin fully cures and an amount of heat being added to the portion of the thermoset resin by the stimulus such that the outlet of the feeder remains a predetermined distance from a curing front of the output thermoset resin.

2. The device of claim 1, wherein the feeder includes a nozzle and the nozzle defines the outlet, wherein the outlet of the nozzle is for extruding the thermoset resin.

3. The device of claim 1, wherein the feeder includes a printhead and the outlet is a roller for directing the thermoset resin.

4. The device of claim 1, wherein the feeder and the stimulation source are stationary relative to each other.

5. The device of claim 1, wherein the stimulus from the stimulus source is the only stimulus applied to the portion of the output thermoset resin.

6. The device of claim 1, wherein the portion of the output thermoset resin at which the stimulus is directed remains a predetermined distance from the outlet of the feeder throughout extrusion of the thermoset resin.

7. The device of claim 1, wherein the simulation source includes a laser.

8. The device of claim 1, wherein the stimulus includes infrared light.

9. The device of claim 1, wherein the stimulus includes ultraviolet light.

10. The device of claim 1, wherein the stimulus includes visible light.

11. The device of claim 1, wherein the stimulus includes microwaves.

12. The device of claim 1, wherein the stimulus includes an electromagnetic field.

13. The device of claim 1, wherein the stimulus includes ultrasonic waves.

14. The device of claim 1, wherein the device is capable of outputting thermoset resin that includes an embedded reinforcing material.

15. The device of claim 14, wherein the embedded reinforcing material includes a continuous fiber.

16. The device of claim 14, wherein the embedded reinforcing material includes discontinuous fibers.

17. The device of claim 14, wherein the embedded reinforcing material includes nanoparticles.

18. The device of claim 1, wherein the thermoset resin includes a cyclic olefin.

19. The device of claim 1, wherein the thermoset resin includes an epoxy.

20. The device of claim 1, wherein the thermoset resin includes a polyurethane.

21. The device of claim 1, wherein the stimulus heats the portion of the output thermoset resin to fully cure the portion of the output thermoset resin to at least 96% cured.

\* \* \* \* \*